United States Patent
Patey et al.

(10) Patent No.: US 10,024,328 B2
(45) Date of Patent: Jul. 17, 2018

(54) VACUUM PUMP

(71) Applicant: Edwards Limited, West Sussex (GB)

(72) Inventors: Alexander James Patey, Reigate (GB); Emiliano Lucchetta, Worthing (GB); Ian Keech, Washington (GB); Mohammad Eghtesadi Bahrami, Crawley (GB); Richard Glyn Horler, Crawley (GB)

(73) Assignee: Edwards Limited, Burgees Hills, West Sussex (GB)

( * ) Notice: Subject to any disclaimer, the term of this patent is extended or adjusted under 35 U.S.C. 154(b) by 314 days.

(21) Appl. No.: 14/438,140

(22) PCT Filed: Oct. 14, 2013

(86) PCT No.: PCT/GB2013/052673
§ 371 (c)(1),
(2) Date: Apr. 23, 2015

(87) PCT Pub. No.: WO2014/068277
PCT Pub. Date: May 8, 2014

(65) Prior Publication Data
US 2015/0275902 A1    Oct. 1, 2015

(30) Foreign Application Priority Data

Oct. 30, 2012 (GB) .................. 1219518.6

(51) Int. Cl.
*F04D 15/00* (2006.01)
*F04D 19/04* (2006.01)
(Continued)

(52) U.S. Cl.
CPC .......... *F04D 19/042* (2013.01); *F04D 27/00* (2013.01); *F04D 27/001* (2013.01);
(Continued)

(58) Field of Classification Search
CPC ...... F04D 19/042; F04D 27/00; F04D 27/001; F04D 27/0292; F04D 29/057;
(Continued)

(56) References Cited

U.S. PATENT DOCUMENTS 3,071,323 A * 1/1963 Chitayat ................. G06M 1/02
                                                              235/125
4,641,978 A    2/1987 Kapich
(Continued)

FOREIGN PATENT DOCUMENTS

CN    1842655 A    10/2006
CN    1973134 A    5/2007
(Continued)

OTHER PUBLICATIONS

Prosecution history of corresponding Chinese Application No. CN201380057109.2 including: Office Action dated May 25, 2016 and Chinese Search Report dated May 17, 2016.
(Continued)

*Primary Examiner* — Kenneth Bomberg
*Assistant Examiner* — Brian Delrue
(74) *Attorney, Agent, or Firm* — Theodore M. Magee; Westman, Champlin & Kohler, P.A.

(57) ABSTRACT

The present invention relates to a vacuum pump comprising a turbo molecular pumping mechanism wherein an operative characteristic of the turbomolecular pumping mechanism is dependent on the orientation of the vacuum pump and the pump comprises an orientation sensor for sensing the orientation.

20 Claims, 5 Drawing Sheets

(51) Int. Cl.
  *F04D 27/00*  (2006.01)
  *F04D 29/063* (2006.01)
  *F04D 27/02*  (2006.01)
  *F04D 29/057* (2006.01)
  *F04D 29/058* (2006.01)
  *F04D 29/056* (2006.01)

(52) U.S. Cl.
  CPC ....... *F04D 27/0292* (2013.01); *F04D 29/057* (2013.01); *F04D 29/058* (2013.01); *F04D 29/063* (2013.01); *F04D 29/056* (2013.01)

(58) Field of Classification Search
  CPC .... F04D 29/058; F04D 29/063; F04D 29/056; F04D 15/0077; F04D 15/0272; F04D 25/0666
  USPC ................... 415/13, 14, 15, 90, 118; 417/63
  See application file for complete search history.

(56) References Cited

U.S. PATENT DOCUMENTS

| | | | |
|---|---|---|---|
| 5,059,092 A | 10/1991 | Kabelitz et al. | |
| 6,074,165 A | 6/2000 | Casaro et al. | |
| 6,524,005 B2 | 2/2003 | Bridges | |
| 6,736,593 B2* | 5/2004 | Namiki | F04D 19/048 415/1 |
| 7,736,062 B2 | 6/2010 | Hagshenas et al. | |
| 2003/0180162 A1* | 9/2003 | Beyer | F04D 19/048 417/353 |
| 2005/0106043 A1* | 5/2005 | Casaro | F04D 19/042 417/363 |
| 2011/0033317 A1 | 2/2011 | Greven et al. | |
| 2011/0103934 A1* | 5/2011 | Ohtachi | F04D 19/042 415/118 |
| 2011/0176910 A1* | 7/2011 | Schroeder | F04D 19/042 415/90 |
| 2012/0063918 A1 | 3/2012 | de Larminat | |
| 2012/0209569 A1 | 8/2012 | Becourt et al. | |
| 2015/0204353 A1* | 7/2015 | Kogame | F04D 29/701 415/121.2 |
| 2015/0292515 A1 | 10/2015 | Bahrami et al. | |

FOREIGN PATENT DOCUMENTS

| | | |
|---|---|---|
| CN | 102011745 A | 4/2011 |
| CN | 201908851 U | 7/2011 |
| CN | 102155425 A | 8/2011 |
| CN | 102242722 A | 11/2011 |
| EP | 0851127 A2 | 7/1998 |
| EP | 1895180 A2 | 3/2008 |
| EP | 2314877 A1 | 4/2011 |
| JP | 05157664 A * | 6/1993 |
| JP | H05157664 A | 6/1993 |
| JP | H0942290 A | 2/1997 |
| JP | 2003148386 A | 5/2003 |
| JP | 2006009759 A | 1/2006 |
| JP | 2006022914 A | 1/2006 |

OTHER PUBLICATIONS

British Examination Report dated Feb. 27, 2013 and Search Report dated Feb. 26, 2013 for corresponding British Application No. GB1219518.6.
PCT International Search Report and Written Opinion dated Jan. 15, 2014 for corresponding PCT Application No. PCT/GB2013/052673.
British Examination Report dated Nov. 23, 2015 and Search Report dated Nov. 20, 2015 for corresponding British Application No. GB1509857.7.
Office Action dated May 4, 2016 and Search Report dated Apr. 25, 2016 for corresponding Chinese Application No. 201380057294.5.
British Search Report and Examination Report dated Feb. 26, 2013 for corresponding British Application No. GB1219517.8.
PCT International Notification of Transmittal of the International Search Report and Written Opinion of the International Search Authority, or the Declaration, PCT International Search Report and PCT International Written Opinion dated Jan. 23, 2014 for corresponding PCT Application No. PCT/GB2013/052672.
Prosecution history of U.S. Appl. No. 14/438,148 including: Amendment dated Aug. 10, 2017 and Office Action dated Apr. 12, 2017.

* cited by examiner

VACUUM PUMP

CROSS-REFERENCE TO RELATED APPLICATION

This application is a Section 371 National Stage Application of International Application No. PCT/GB2013/052673, filed Oct. 14, 2013, which is incorporated by reference in its entirety and published as WO 2014/068277 A1 on May 8, 2014 and which claims priority of British Application No. 1219518.6, filed Oct. 30, 2012.

FIELD OF THE INVENTION

The invention relates to a vacuum pump.

BACKGROUND

The use of a turbomolecular pumping mechanism in a vacuum pump is known hereto. A turbomolecular pumping mechanism is typically used for generating high or ultra high vacuums having a pressure of between about $10^{-3}$ to $10^{-10}$ mbar. In order to generate such high vacuums, the rotor blades are rotated at high rotational speeds by a drive shaft for example between about 20,000 and 90,000 revolutions per minute. A turbomolecular pumping mechanism requires precision manufacturing techniques and close tolerances in order to achieve such high speeds and vacuums.

The discussion above is merely provided for general background information and is not intended to be used as an aid in determining the scope of the claimed subject matter. The claimed subject matter is not limited to implementations that solve any or all disadvantages noted in the background.

SUMMARY

The present invention provides an improved vacuum pump.

The present invention provides a vacuum pump comprising a turbomolecular pumping mechanism and an orientation sensor for sensing an orientation of the vacuum pump.

The orientation sensor in a preferred example is an accelerometer, and in this case, the accelerometer may be additionally arranged to sense impacts imparted to the pump for determining a condition of the pump which is sensitive to such impacts.

Other preferred and/or optional aspects of the invention are defined in the accompanying claims.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In order that the invention may be well understood, some embodiments thereof, which are given by way of example only, will now be described with reference to the accompanying drawings in which.

DETAILED DESCRIPTION

Figure 1:
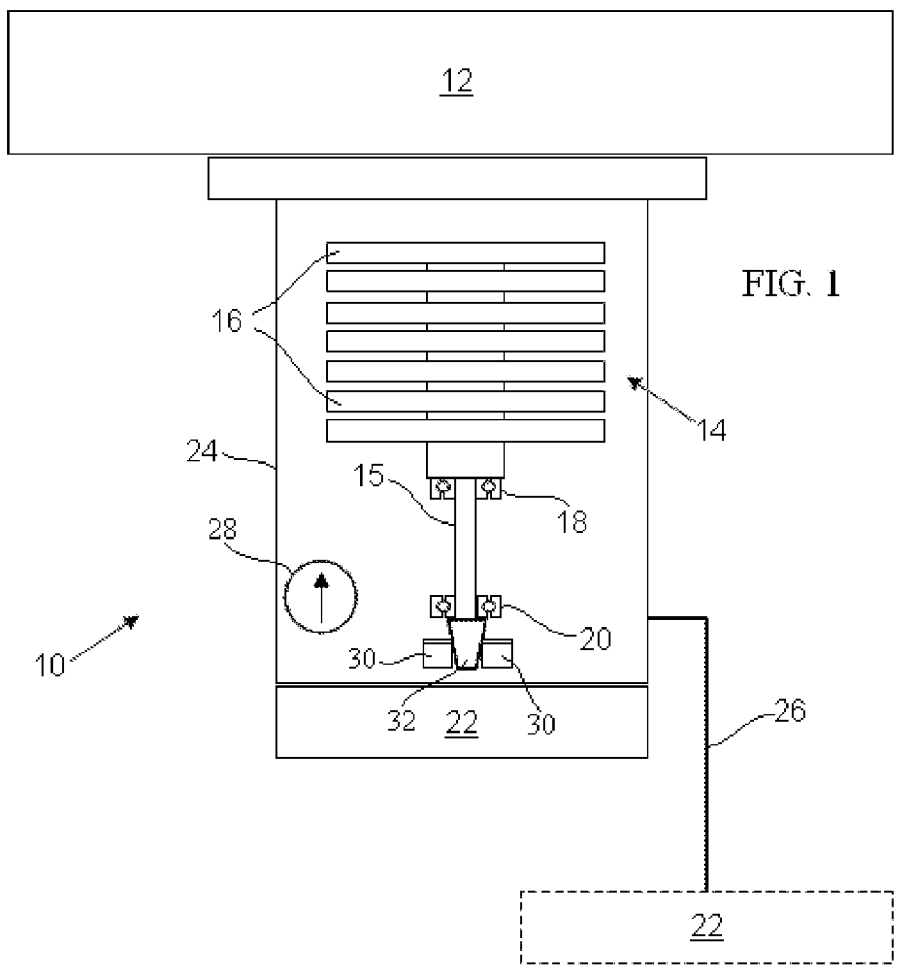
FIG. 1 is a schematic drawings of a vacuum pump.

Referring to FIG. 1, a vacuum pump 10 is shown for evacuating an enclosure 12 of a vacuum system. The vacuum pump comprises a turbomolecular pumping mechanism 14 having seven arrays of rotor blades 16 constituting with stator blades (not shown) seven consecutive stages of the mechanism. There can be other pumping mechanisms included in the pump on shaft, for example molecular drag stages or regenerative pumping stages. A greater or fewer number of stages than seven may be provided as required.

A turbomolecular pumping mechanism is typically used for generating high or ultra high vacuums having a pressure of between about $10^{-3}$ to $10^{-8}$ mbar. In order to generate such high vacuums, the rotor blades are rotated at high rotational speeds by drive shaft 15 for example between about 20,000 and 90,000 revolutions per minute. The drive shaft 15 is supported for rotation at its lower end portion by lubricated bearings 18, 20 and at its upper end portion by a magnetic bearing (not shown). Bearings other than magnetic type bearings may replace the bearings at the upper end portion.

A motor (not shown) rotates the drive shaft 15. A motor drive 22 comprising an inverter and a variable power controller provides the necessary electrical signals for driving the motor. The drive 22 can be located adjacent or in contact with the pump housing 24 or located remotely and connected to the motor by a cable 26, as shown in broken lines.

A lubrication circuit, or supply, is established for supplying lubricant to relatively moving surfaces of the vacuum pump which in the example shown comprises at least the bearing 20 for supplying lubricant between relatively moving inner and outer races of the bearing to allow friction reduced rotation of the roller bearing members. The lubrication circuit is described in more detail below with reference to FIG. 2. The supply of lubricant is dependent on the orientation of the vacuum pump, which is shown in an upright orientation in FIGS. 1 and 2. In this regard, the lubricant circuit is arranged such that gravitational force causes lubricant to flow along a downward directed portion of the circuit only in the upright orientation of the vacuum pump.

Operation of the turbomolecular pumping mechanism 14 and efficient pumping of gas from an enclosure is dependent on the proper functioning of the lubrication supply and the lubrication supply is dependent upon on the orientation of the vacuum pump. Other operative characteristics of the vacuum pump such as the loading on, or forces associated with, for example the bearings, the pumping mechanism or the drive shaft are affected by the orientation of the pump. The effect of the orientation of the pump may reduce performance of the pump from the rated or optimum levels or in more severe circumstances may cause failure of the pump, whether quickly or over time.

Operation of the pump is dependent on its orientation, on the lubrication system and other operative characteristics as described above but also the performance of the pump is dependent on its orientation during storage or transportation particularly over sustained periods. For example, transportation or storage in an undesirable orientation may cause damage to the pump or otherwise deteriorate its performance when in use.

In the embodiment shown in FIG. 1, the pump 10 comprises an orientation sensor 28 for sensing the orientation of the pump. The orientation sensor 28 is fixed in relation to a stationary part of the pump which in this embodiment is the pump housing. The orientation sensor may be fixed within the pump housing as shown or in other examples may be fixed to an exterior of the pump housing or alternatively may be fixed to another part which is fixed relative to the pump, such as a motor drive unit.

Figure 2:
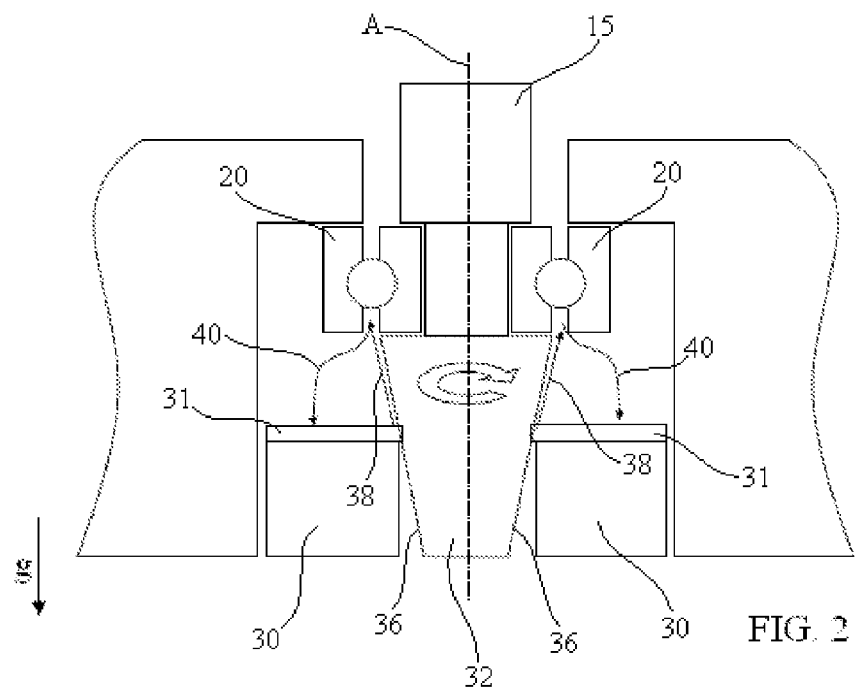
FIG. 2 shows an aspect of the vacuum pump in more detail in one orientation of the vacuum pump.
Figure 3:
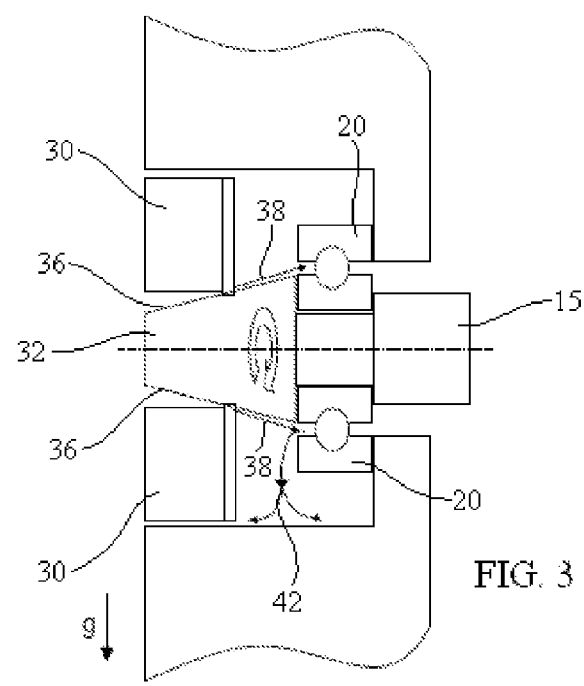
FIG. 3 shows the same aspect of the vacuum pump in another orientation of the vacuum pump.
Figure 4:
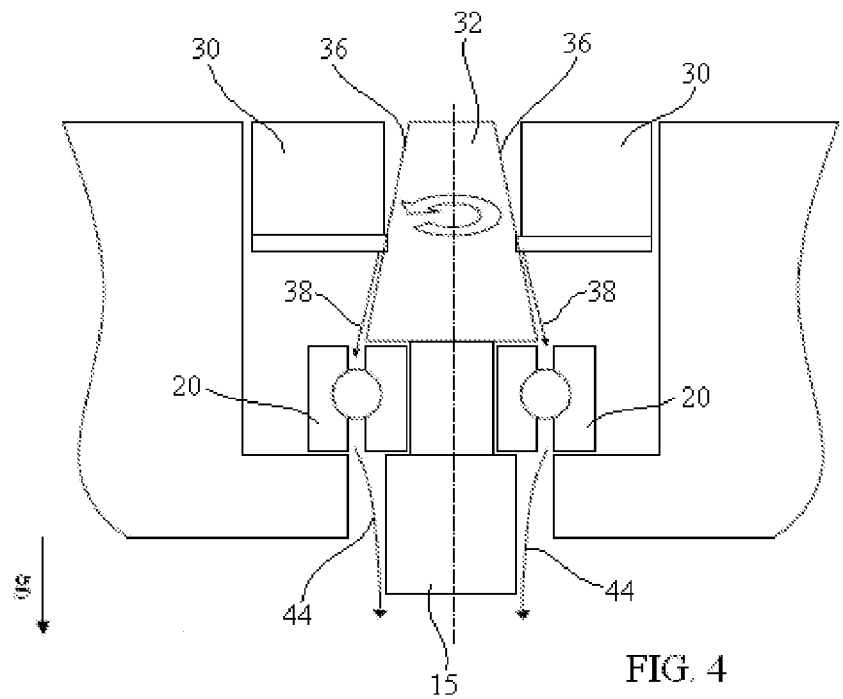
FIG. 4 shows the same aspect of the vacuum pump in yet another orientation of the vacuum pump.

The orientation sensor is preferably one that senses gravitational force 'g' as shown in FIGS. 2 to 4 and determines orientation of the vacuum pump in relation to the direction of gravitational force. The orientation sensor is not restricted to sensing gravity and other frames of reference may be used for example the orientation sensor may be sensitive to a fixed beacon which provides data corresponding to a fixed dimension or direction. In one example, the orientation sensor is a tilt sensor which senses when the vacuum pump is tilted with respect to an upright orientation or the direction of gravitational force. In another example, the orientation sensor is an accelerometer which senses acceleration forces applied to the pump.

Referring to FIG. 2, part of the vacuum pump 10 is shown in more detail in an upright orientation. The lubrication supply comprises lubricant sumps 30 for containing lubricant such as oil. The lubricant sump may be filled prior to transportation or use, or optionally filled a short period before use to avoid lubricant leaking from the sump during transportation or storage. The lubricant sump may comprise a felt bed for containing lubricant in a matrix of material. The sump comprises a top portion 31 which is closely adjacent to or in contact with a conical portion 32 of the drive shaft 15 arranged for transporting lubricant from the sump to the bearing 20. In this regard, the rotating conical surfaces 36 of the drive shaft pick up lubricant from the top portion 31 of the sump and cause the lubricant to flow radially outwardly and upwardly towards the bearings 20 as shown by arrows 38. Lubricant 40 dispersed from the bearings drops under gravity to be re-absorbed by the sumps for further circulation.

Referring to FIG. 3, the lubrication supply of vacuum pump 10 is shown in a horizontal orientation rotated or tilted through 90 degrees from the upright orientation shown in FIGS. 1 and 2 with respect to the direction of gravitational force g. The performance of the vacuum pump is degraded by its orientation in FIG. 3. In this regard, rotation of the drive shaft 15 and in particular the conical lower end portion 32 causes lubricant to be swept along the rotating tapering surfaces 36 from the sumps 30 towards the bearing 20. The horizontal orientation of the pump does not significantly affect transportation of the lubricant from the sumps to the bearing. However, the return path of the lubricant from the bearing to the sumps is degraded by the orientation of the pump in FIG. 3 since not all of the lubricant returns to the sumps. Some of the lubricant falls away from the sumps as indicated by the flow paths 42 and may collect in the pump housing 24. This orientation therefore can lead to reduced performance or possibly failure over sustained periods of operation.

The amount by which the pump is tilted towards the FIG. 3 orientation affects the performance of the pump. A small amount of tilt may not cause any significant reduction in pump performance because the return path for lubricant guides it into the sumps. The problem becomes more significant when the return path guides more lubricant away from the sumps and in the example shown this may occur at an angle approaching 90 degrees from the upright orientation. In other pumps, the arrangement may be such that a horizontal orientation is impermissible as it may cause failure.

Of course, other parts, components or functionality of the vacuum pump are affected by its orientation as discussed above. For example, the bearing 18 is configured for use in an upright orientation and use in the horizontal orientation causes a change in loading on the bearings which can reduce its lifetime before requiring maintenance or before failure.

Referring to FIG. 4, the lubrication supply of vacuum pump 10 is shown in a inverted orientation rotated or tilted through 180 degrees from the upright orientation shown in FIGS. 1 and 2 with respect to the direction of gravitational force g. The performance of the vacuum pump is degraded by its orientation in FIG. 4. In this regard, rotation of the drive shaft 15 and in particular the conical lower end portion 32 causes lubricant to be swept along the rotating tapering surfaces 36 from the sumps 30 towards the bearing 20. Gravitational force assists this lubricant transfer which can lead to over-lubrication of the bearings. Additionally, the return path of the lubricant from the bearing to the sumps is reliant on gravitational force and in the orientation of the pump in FIG. 4 the lubricant falls away from the sumps as indicated by the flow paths 44 and collects elsewhere in the pump housing 24. Over a relatively short time the sumps dry out and become depleted of lubricant thereby starving the bearing of lubrication causing degradation of performance, ultimately leading to pump failure.

The performance of the pump and duration prior to failure is reduced the closer the orientation of the pump is towards inverted and therefore the sensor may be configured to sense an angle of orientation intermediate the horizontal orientation and the inverted orientation.

As discussed above in relation to the horizontal orientation, other parts, components or functionality of the vacuum pump are affected in an inverted orientation, in the same or different ways.

Figure 5:
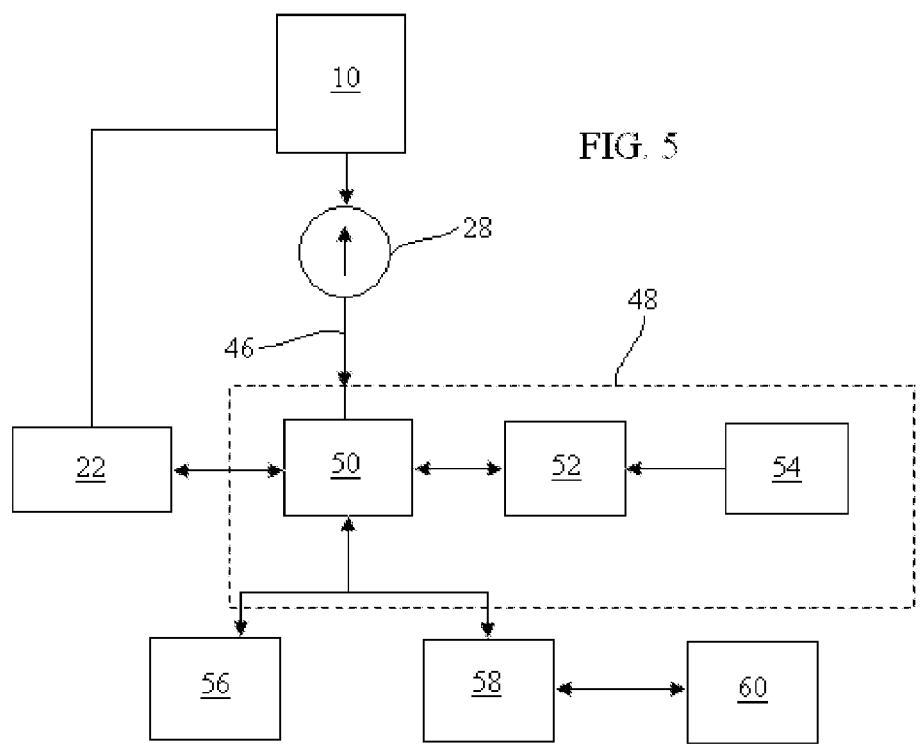
FIG. 5 shows a control system of the vacuum pump.

Referring to FIG. 5, a control system is shown according to an embodiment of the invention. A pump 10 is installed for evacuating a chamber and electrical power is supplied to the drive 22. If the drive is fixed in its orientation relative to the pump, it is convenient to house the orientation sensor 28 in the drive since electrical power can readily be delivered to the sensor together with the other electrical components of the drive. When activated the sensor determines the orientation of the vacuum pump 10. Typically and as discussed above, when the vacuum pump is configured for operation in at least one permissible orientation (e.g. upright as shown in FIGS. 1 and 2 and horizontal as shown in FIG. 3 although with potentially reduced performance) and the vacuum pump is operated in an orientation other than said at least one permissible orientation (e.g. inverted as shown in FIG. 4) it at least degrades performance of the turbomolecular pumping mechanism, whether by causing failure of the pump or by increasing wear and reducing lifetime. Of course, in pump designs other than the example shown in FIGS. 1 to 4 an inverted orientation or a horizontal orientation may be preferred and an upright orientation degrades performance of the pump.

The orientation of the pump during use affects short and long term pump performance. Additionally, storage or transportation of the pump in an impermissible orientation affects subsequent performance of the pump particularly if a pump is maintained in an impermissible orientation for sustained periods. It is normally the case that a pump is transported or stored without connection to electrical power and therefore if orientation during transportation or storage is to be determined the vacuum pump comprises an electrical power supply arranged for supplying power to the sensor. A suitable power supply would be a battery.

The orientation sensor is arranged to output a signal 46 indicative of the orientation of the vacuum pump for input to a control unit 48. The control unit 48 is responsive to the signal 46 and may be arranged for example to control operation of the vacuum pump dependent on the sensed orientation or compile data corresponding to the sensed orientation.

In FIG. 5, the signal 46 is processed by a processing unit 50 of the control unit. The control unit 48 may be part of a control unit of the pump programmed to process the signal 46, a bespoke unit configured accordingly or a computer, such as a laptop programmed with instructions for processing the signal 46. The processing unit is connected to the drive 22 and outputs control signals to the drive dependent on the sensed orientation of the pump. In this regard, if the sensed orientation is a permissible orientation, such as upright in the present example, the drive is allowed to operate the pump as normal. If the pump is an impermissible orientation, such as inverted, the drive may be controlled to prevent operation of the pump or to allow operation of the pump within confined parameters, such as at a reduced rotational speed.

The drive 22 may also be configured for supplying data to the control unit 48 relating to operation of the pump. For example, operation in an impermissible orientation may reduce the period which the pump can be operated before maintenance is required. Therefore the drive may supply data relating to the speed of rotation of the pump over time for use by the control unit 48 for determining a next maintenance event.

The processing unit 50 can write to and read from a store or memory 52 for storing the sensed orientations of the pump. The sensed orientations which are stored may be associated with a duration in which the pump is orientated in each orientation according to an input from a timer unit 54. For example, if the pump is used in a horizontal orientation, the memory stores the orientation 'horizontal' for a period of 100 hours operation. This compilation of use can be used to determine maintenance periods for a customer or checking post sale use of a pump.

The processor unit 50 is arranged to read compiled data from the memory 52 for displaying information to a user on a display 56. Such information may include a warning regarding operation of a pump in an impermissible orientation or the hours of use remaining in any given orientation. The processor unit is also arranged to output data from the memory to a transceiver 58 for transmission to a remote location 60.

The remote location may be a pump supplier to enable the pump supplier to monitor in which orientation the pump is being operated. This information allows the supplier for example to time maintenance periods dependent on real time pump usage or to anticipate the occurrence of faults. The supplier can also transmit control signals to the transceiver for controlling operation of the vacuum pump drive 22 if for example the pump is being operated in an impermissible orientation.

The vacuum pump 10 described above comprises an orientation sensor for sensing orientation of the pump. The orientation of the pump can affect the operational lifetime of the pump prior to requiring maintenance. In addition to orientation, a vacuum pump may receive impacts which affect its operational lifetime. In one of the examples described above, the sensor 28 is an accelerometer. An accelerometer may be configured additionally to sense impacts imparted to a pump. Particularly, although not exclusively, a back-up bearing of a pump may be sensitive to impacts and require maintenance or replacement after a certain amount of use. The following description describes the use of an accelerometer in a turbomolecular pump for sensing use of a back-up bearing in addition to use of the accelerometer to determine pump orientation.

Figure 6:
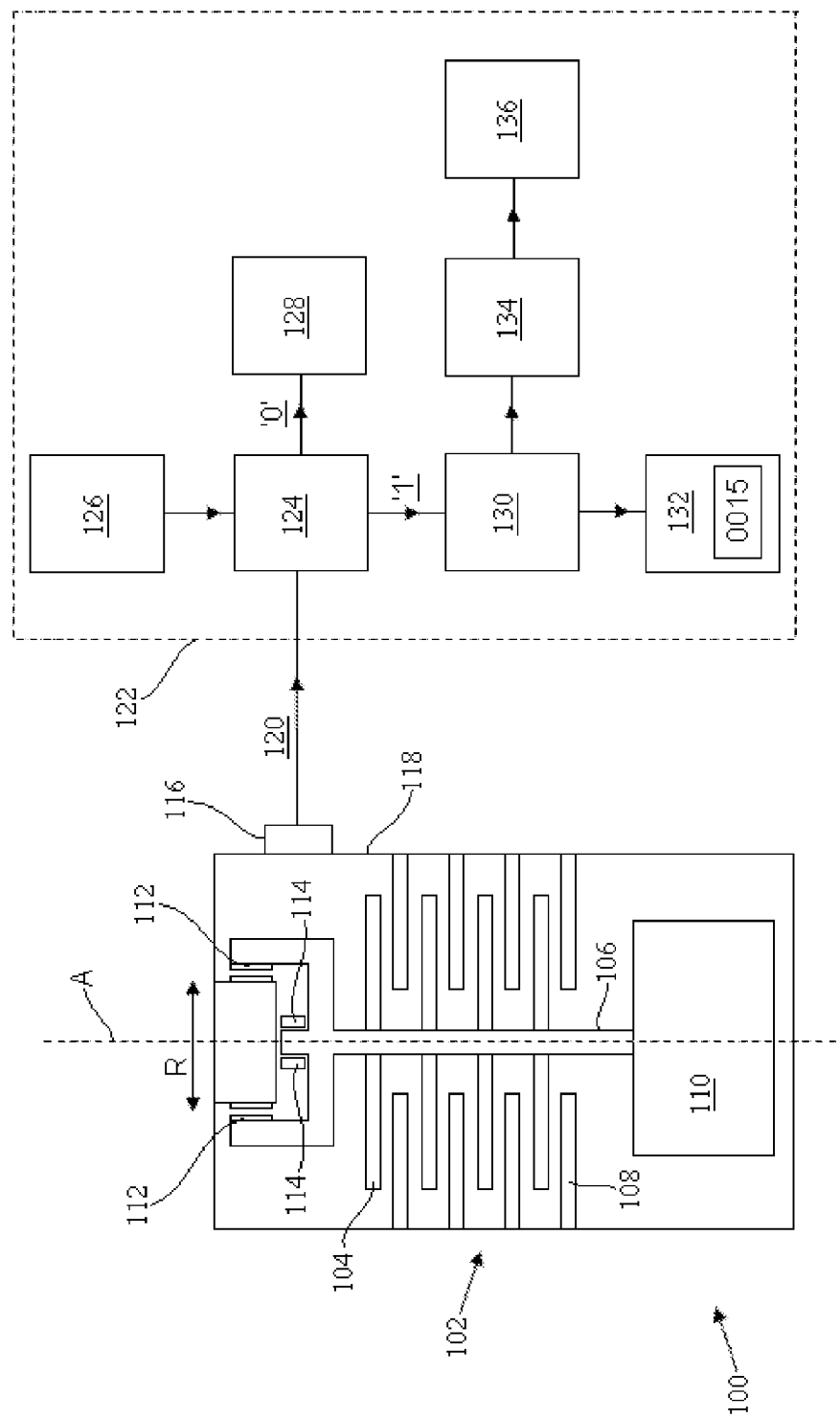
FIG. 6 shows a schematic representation of another vacuum pump.
Figure 7:
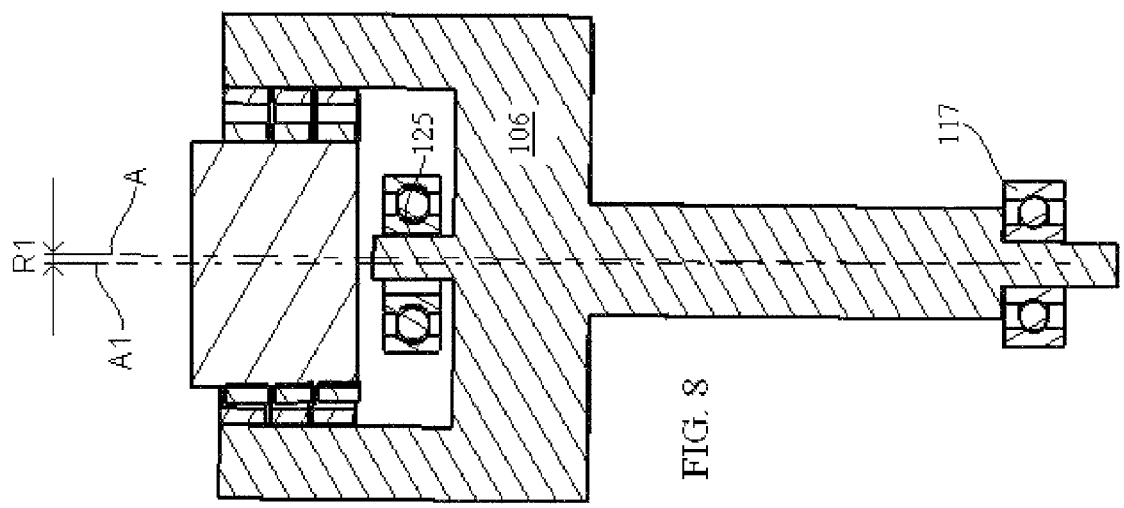
FIG. 7 shows the bearing assemblies of the vacuum pump of FIG. 6 in more detail.
Figure 8:
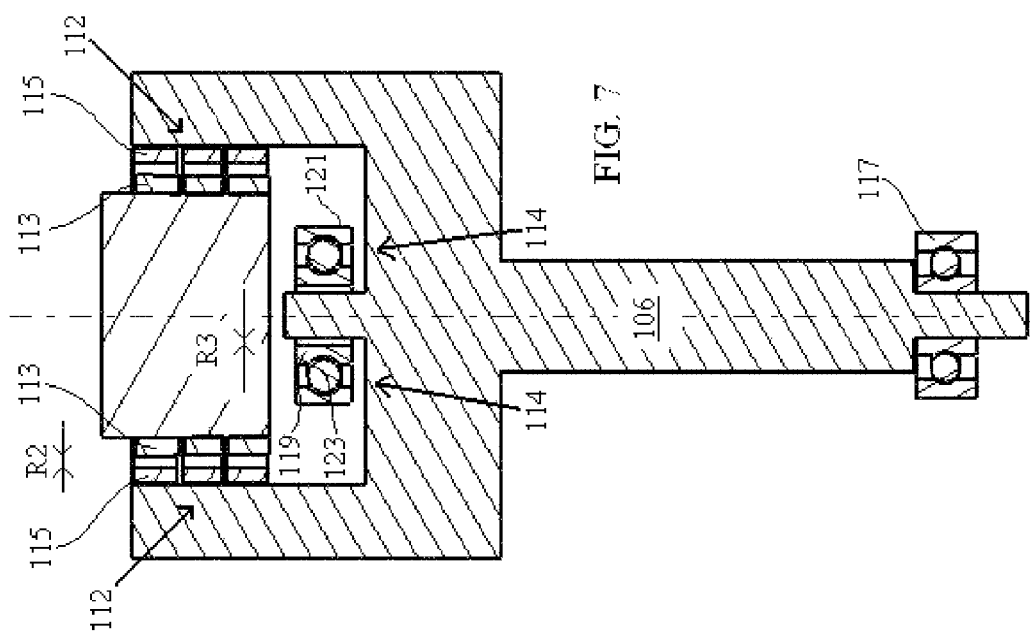
FIG. 8 shows the back-up bearing assembly limiting movement of a drive shaft of the vacuum pump in FIG. 6.

Referring to FIGS. 6 to 8, a vacuum pump 100 is shown which comprises a vacuum pumping mechanism 102 which in the present case is a turbomolecular vacuum pumping mechanism although the pump may comprise other molecular vacuum pumping mechanisms. The pumping mechanism comprises a rotor comprising four arrays of rotor blades 104 supported for rotation by a drive shaft 106. The rotor blades are rotated relative to respective arrays of stator blades 108. Any suitable number of stages may be provided. A motor 110 is arranged to drive the drive shaft.

A first bearing assembly 112 controls movement of the rotor and drive shaft in the direction R during rotation of the drive shaft about rotational axis A. Direction R is principally movement in the radial direction although it has a small element in the axial direction, since the drive shaft is angularly displaced about a lower bearing assembly 117 discussed in more detail below. In the embodiment shown the vacuum pumping mechanism is a turbomolecular pumping mechanism which is rotated at rotational speeds of between about 20,000 and 90,000 revolutions per minute, and in order to reduce friction between the first bearing assembly and the rotating parts of the pump, the first bearing assembly 112 is a non-contact bearing assembly which controls radial movement without contacting the rotor or the drive shaft. An example of a non-contact bearing is a magnetic bearing assembly in which opposite generally annular magnetic poles 113, 115 are located on the rotating part and the fixed part respectively. In this example, movement of the rotating magnetic pole on the drive shaft towards the fixed magnetic pole causes an increased magnetic force to be applied to the rotating magnetic pole in a radial direction of the drive shaft thereby bringing the drive shaft back into correct alignment. This arrangement is low friction and therefore suitable for such high speed pumps, but as the bearing is non-contact it allows some radial movement of the rotor and the drive shaft, particularly if the vacuum pump receives an external impact or knock.

Movement of the drive shaft 106 is shown in the normal condition in FIG. 7 and in a displaced position in FIG. 8. The second bearing assembly 117 supports a lower end of the drive shaft and is fixed relative to the pump housing. When the vacuum pump is knocked, the axis A of the drive shaft is angularly displaced about the second bearing 117 to an axis A1. The angular displacement causes a radial displacement of R1 of the axes A and A1 together with some axial displacement.

A back-up bearing assembly 114 limits radial movement of the rotor and drive shaft for example to prevent clashing between the rotating parts of the pump and the stationary parts of the pump. Clashing causes damage to the pumping mechanism and can be hazardous, particular as the rotor blades 104 are rotating at speeds of up to 90,000 rpm. The back-up bearing assembly 114 is arranged to limit radial movement by contact with the rotor or the drive shaft. One example of a back-up bearing assembly shown in FIGS. 7 and 8 comprises a rolling bearing mechanism having an inner race 119 facing radially inwardly towards a rotating part and a stationary outer race 121. Rolling members 123 such as ceramic balls are located between the races to allow relative rotational movement. As shown in FIG. 8, when a rotating part of the pumping mechanism moves radially by a determined distance it contacts the inner race 119 and causes relative rotation between the races until the rotating part returns to its normal operative position. Each such contact event causes the back-up bearing assembly to wear or become degraded and over time the back-up bearing requires replacement, since otherwise it may fail in use and damage the pumping mechanism. In this regard, the back-up bearing is typically located at the inlet of the vacuum pump and therefore is a dry bearing which is not lubricated to avoid contamination of a pumped gas stream with lubricant. If the back-up bearing assembly is not replaced and fails in use, the pump may be damaged and inoperative causing in turn damage to vacuum processing equipment or cancellation of procedures requiring a vacuum environment. Preferably therefore, the back-up bearing assembly is replaced or repaired by a safety margin in advance of failure.

As shown in FIGS. 6 to 8, the first bearing assembly is spaced from the rotor or the drive shaft by a distance R2 which is greater than the distance R3 which the back-up bearing assembly is spaced from the rotor or the drive shaft. This arrangement prevents damage being caused to the first bearing assembly when the drive shaft or rotor is displaced because the back-up bearing assembly makes contact with the rotor or drive shaft first at point 125 shown in FIG. 8 and prevents further displacement towards the first bearing assembly.

A force may be imparted to the vacuum pump if it is knocked, for example, by a user while in use or when it is being installed or transported. In some vacuum pumping applications, the vacuum pump is required to be easily transported from one location to another, for example, within devices such as accelerators for cancer treatment in different locations in a hospital. It is convenient therefore to mount the vacuum pump on a transporter such as a trolley or other mobile, or wheeled, unit, however transporting the vacuum pump in this way renders it more susceptible to knocks due to accidental collisions or transport over uneven surfaces. The force required to bring the back-up bearing into use varies dependent on characteristics of the vacuum pump, for example the controlling magnetic force which can be generated by the first bearing assembly. A typical force which is sufficient to cause operation of the back-up bearing assembly is 10 to 100 N applied to the vacuum pump generally in the radial and/or axial direction, although the exact range of forces will depend on the structure and arrangement of the pump and may be higher or even lower.

A sensor 116 is arranged for sensing when radial movement of the rotor or drive shaft is limited by the back-up bearing assembly. In the arrangement shown, the sensor is fixed relative to a pump housing 118, for example, to an outer surface of the pump housing and senses the force applied to the pump housing. The sensor may be an accelerometer for sensing acceleration of the pump housing resulting from the applied force. It is determined prior to operation that an acceleration of 'x' meters per second per second causes implementation of the back-up bearing assembly and therefore a contact event is determined to have occurred when the sensor senses an acceleration equal to or greater than 'x'.

In other arrangements the sensor may comprise means for detecting contact between the rotor or drive shaft and the back-up bearing assembly. One such arrangement may comprise an electrical circuit which is closed on contact. Another arrangement may comprise a proximity switch. Yet another arrangement may comprise means for detecting relative movement of the inner and outer races of the back-up bearing assembly. All sensor arrangements for determining the occurrence of a contact event are included within the scope of the present invention.

The accelerometer arrangement may be preferred in some embodiments because it is capable of sensing a magnitude of an impact in addition to sensing an impact per se. If a sensor is arranged to sense a magnitude of a force imparted to the vacuum pump, the sensed magnitude can be associated with the damage caused to the back-up bearing assembly. For example, a back-up bearing assembly may fail after 500 stronger impacts or 1000 weaker impacts. As explained in more detail below, replacement of a back-up bearing assembly is triggered when the number of sensed impacts exceeds a predetermined value, for example 10,000 impacts. A strong impact may be equivalent to two weaker impacts in the example above and therefore if a strong impact is sensed the total number of impacts recorded is increased by two even though only a single impact has been sensed. The arrangement may have two values representative of strong or weak impacts and add one to the count if a weak impact is sensed or two to the count if a strong impact is sensed. The strength of impacts could of course be divided into more than two different strengths for greater accuracy.

In another arrangement, the total aggregate force applied to the vacuum pump can be measured or the total acceleration experienced by the vacuum pump. For example, if an impact with a force of 50 N causes a single impact and 10,000 such impacts means that replacement of the back-up bearing is necessary, the total force applied to the vacuum pump is 500,000 N. Accordingly, when the total sensed force exceeds 500,000 N replacement is triggered.

Referring particularly to FIG. 6, the sensor 116 is arranged to output a signal 120 corresponding with the detection of a contact event, the force applied to the vacuum pump or the acceleration experienced. The sensor signal 120 is output to a processor 122 configured to process the output. In the arrangement shown, the processor comprises a comparator 124 for comparing the acceleration sensed by the accelerometer with a value stored in a store 126 and outputting binary '1' if the acceleration is greater than the stored value or outputting binary '0' if the acceleration is less than the stored value. There may be more than one stored value representative of strong and weak impacts. A binary '0' is a determination that no contact has occurred and therefore the reading is disposed at step 128. A binary '1' is output to a counter 130 for counting the number of events when the back-up bearing assembly limits radial movement of the rotor or drive shaft. The counter reading may be displayed on a display 132 for reading by a user. As shown, the display is displaying 15 events. The user can be supplied with a value above which replacement of the back-up bearing assembly is required so that when the display displays for example 1000 events or 5000 events, the user must request pump maintenance. Alternatively, the count may be output to a comparator 134 for comparing the count with a value for the maximum number of events permitted. A positive comparison is output to a unit 136 for generating a warning indication, for example, an audible or visible warning. The unit 136 may comprise a transmitter for transmitting a warning indication to a pump supplier located remote from the vacuum pump by wired or wireless connection who can determine a requirement for pump maintenance.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising:
   a rotor;
   an orientation sensor for sensing an orientation of the vacuum pump; and
   a processing unit that is configured to use the sensed orientation to determine that the vacuum pump is in a permissible or an impermissible orientation and is configured to perform at least one of:
   controlling the rotor such that a rotational speed of the rotor is reduced while allowing the vacuum pump to continue to operate in the impermissible orientation;
   in the permissible orientation, controlling the rotor to allow the vacuum pump to continue to operate for a period of time corresponding to a predetermined maintenance event, and in the impermissible orientation, controlling the rotor to allow the vacuum pump to continue to operate for another period of time that is less than the period of time corresponding to the predetermined maintenance event;
   controlling the rotor to allow the pump to continue to operate in the impermissible orientation and controlling a display unit to display that the pump is in the impermissible orientation and to display a length of time that the vacuum pump is allowed to operate in the impermissible orientation.

2. The vacuum pump as claimed in claim 1, comprising a pump housing and wherein the orientation sensor is fixed relative to the pump housing.

3. The vacuum pump as claimed in claim 1, wherein the orientation sensor is a tilt sensor.

4. The vacuum pump as claimed in claim 1, wherein the orientation sensor is an accelerometer.

5. The vacuum pump as claimed in claim 1, comprising a lubrication circuit for supplying lubricant to relatively moving surfaces of the vacuum pump, a supply of lubricant being dependent on the orientation of the vacuum pump.

6. The vacuum pump as claimed in claim 5, wherein the lubricant circuit is arranged such that gravitational force causes lubricant to flow along at least a portion of the lubrication circuit only in said at least one permissible orientation of the vacuum pump.

7. The vacuum pump as claimed in claim 1, wherein the rotor is supported for rotation by a drive shaft, a first bearing assembly for controlling movement of the rotor during rotation of the drive shaft, a back-up bearing assembly for limiting said movement of the rotor, wherein said orientation sensor is configured for sensing when said movement is limited by the back-up bearing assembly.

8. The vacuum pump as claimed in claim 7, wherein said movement of the drive shaft is generally in the radial direction relative to the axis of the drive shaft.

9. The vacuum pump as claimed in claim 7, wherein the back-up bearing assembly is arranged to limit said movement of the rotor by contact with the rotor or the drive shaft, and the sensor is arranged to sense each contact event between the back-up bearing assembly and the rotor or the drive shaft.

10. The vacuum pump as claimed in claim 7, wherein the first bearing assembly is a non-contact bearing assembly which controls said movement of the rotor without contacting the rotor or the drive shaft.

11. The vacuum pump as claimed in claim 10, wherein the first bearing assembly is a magnetic bearing assembly.

12. The vacuum pump as claimed in claim 7, wherein the first bearing assembly is spaced from the rotor or the drive shaft by a distance which is greater than the distance which the back-up bearing assembly is spaced from the rotor or the drive shaft.

13. The vacuum pump as claimed in claim 7, wherein the sensor is arranged to sense a force imparted to the rotor or drive shaft sufficient to cause the back-up bearing to limit said movement of the rotor resulting from the force.

14. The vacuum pump as claimed in claim 13, wherein the sensor is an accelerometer.

15. The vacuum pump as claimed in claim 7, wherein the sensor is fixed relative to a pump housing.

16. The vacuum pump as claimed in claim 7, wherein the sensor is arranged to output a signal to a counter for counting a number of events that the back-up bearing assembly has limited said movement.

17. The vacuum pump as claimed in claim 16, comprising an indicator for indicating to a user when the number of events exceeds a predetermined value predictive of a failure of the back-up bearing assembly.

18. The vacuum pump as claimed in claim 17, wherein the indicator is the display for displaying the number of events.

19. The vacuum pump as claimed in claim 17, wherein the indicator comprises a transmitter for transmitting the number of events to a remote location by wired or wireless connection.

20. The vacuum pump as claimed in claim 7, wherein the sensor is arranged to sense a magnitude of a force imparted to the vacuum pump and associate the damage caused to the back-up bearing assembly dependent on the sensed magnitude.

* * * * *